(12) United States Patent
Ikeda

(10) Patent No.: US 10,313,591 B2
(45) Date of Patent: Jun. 4, 2019

(54) MOTION VECTOR DETECTION DEVICE, METHOD OF CONTROLLING A MOTION VECTOR DETECTION DEVICE, AND IMAGE CAPTURING APPARATUS THAT CHANGE A SIZE AND A NUMBER OF A TEMPLATE BLOCK BASED ON A USE OF A DETECTED MOTION VECTOR

(71) Applicant: CANON KABUSHIKI KAISHA, Tokyo (JP)

(72) Inventor: Shunichiro Ikeda, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 70 days.

(21) Appl. No.: 15/355,084

(22) Filed: Nov. 18, 2016

(65) Prior Publication Data

US 2017/0155824 A1 Jun. 1, 2017

(30) Foreign Application Priority Data

Nov. 26, 2015 (JP) .................................. 2015-230694

(51) Int. Cl.
*H04N 5/232* (2006.01)
*G06T 7/246* (2017.01)
*G06T 7/223* (2017.01)

(52) U.S. Cl.
CPC ......... *H04N 5/23264* (2013.01); *G06T 7/223* (2017.01); *G06T 7/248* (2017.01); *H04N 5/23245* (2013.01); *H04N 5/23254* (2013.01); *G06T 2207/20012* (2013.01); *G06T 2207/20021* (2013.01)

(58) Field of Classification Search
CPC ........................... H04N 5/23264; G06T 7/223
See application file for complete search history.

(56) References Cited

U.S. PATENT DOCUMENTS

| 2007/0181687 A1* | 8/2007 | Fukushima | H04N 5/23212 235/454 |
| 2013/0076921 A1* | 3/2013 | Owen | H04N 5/23258 348/208.4 |
| 2016/0171664 A1* | 6/2016 | Komiya | G06T 5/003 382/275 |

FOREIGN PATENT DOCUMENTS

JP 2892685 B2 5/1999
JP 2015-041819 A 3/2015

* cited by examiner

*Primary Examiner* — Christopher K Peterson
(74) *Attorney, Agent, or Firm* — Venable LLP

(57) ABSTRACT

A motion vector detection device includes at least one processor and at least one memory that function as a detection unit configured to detect a motion vector between a plurality of images, and a control unit configured to perform setting with respect to a detection of the motion vector. The detection unit detects the motion vector by searching for an area, which has a correlation with a template block that is set in one of the plurality of images, within a search range that is set for another one of the plurality of images. The control unit changes a size and a number of the template block, based on a use of the motion vector that is detected by the detection unit.

16 Claims, 7 Drawing Sheets

MOTION VECTOR DETECTION DEVICE, METHOD OF CONTROLLING A MOTION VECTOR DETECTION DEVICE, AND IMAGE CAPTURING APPARATUS THAT CHANGE A SIZE AND A NUMBER OF A TEMPLATE BLOCK BASED ON A USE OF A DETECTED MOTION VECTOR

CLAIM TO PRIORITY

This application claims the benefit of Japanese Patent Application No. 2015-230694, filed on Nov. 26, 2015, which is hereby incorporated by reference herein in its entirety.

BACKGROUND OF THE INVENTION

Field of the Invention

The present invention relates to a motion vector detection device, a method of controlling a motion vector device, and an image capturing apparatus.

Description of the Related Art

A technique for detecting a motion vector between two frame images, and correcting an image blur based on the motion vector, is known. For example, template matching is known as a method of detecting a motion vector between frame images.

When template matching is used to detect a motion vector, one of the two frame images is referred to as an original image, and the other one is referred to as a reference image. In the original image, a rectangular region of a predetermined size is set as a template block, and, in the reference image, a rectangular region for use in calculating a correlation value is set as a search range. Then, correlation of the template block with the reference image is calculated for various positions in the search range, and the position at which the correlation is the highest (destination of the template block) is detected. "Motion vector" of the template block refers to the direction and the amount of movement to the destination from the position of the template block of the original image. For example, a plurality of template blocks are set at different positions in the original image, and motion vectors of the respective template blocks are detected and statistically processed so that movement between the frame images is detected, the detected movement being able to be used in image blur correction.

The accuracy in motion vector detection that is performed using template matching depends on various factors such as, for example, the positions, size, and number of set template blocks, the size of a search range, and the size of the original image and the reference image (size reduction ratio).

Japanese Patent No. 2892685 and Japanese Patent Laid-Open No. 2015-41819 disclose that the positions and the numbers of representative points and template blocks are changed, or the shape and the size of a search range are changed, based on object and imaging lens states such as movement, luminance, and distance of an object, and a focal length (field angle) of an imaging lens.

However, the devices in the patent documents noted above do not take into consideration controlling a motion vector detection method based on a factor other than the object and imaging lens state. Furthermore, the targets in the motion vector detection method that are subject to control are limited to the positions and the numbers of representative points and template blocks, and the shape and the size of search ranges, and control based on other factors that affect the accuracy of a motion vector is not taken into consideration. For example, in the techniques described in the patent documents noted above, it is neither possible to control a motion vector detection method based on a factor other than object and imaging lens states, nor to control the size of the template blocks, the size of the images, and the like.

SUMMARY OF THE INVENTION

The present invention was made in order to solve at least one of the problems of such conventional techniques, and provides a motion vector detection device capable of flexibly controlling a motion vector detection method, a method of controlling a motion vector detection device, and an image capturing apparatus.

According to one aspect, the present invention provides a motion vector detection device comprising a detection unit configured to detect a motion vector between a plurality of images and a control unit configured to perform setting with respect to a detection of the motion vector, wherein the control unit changes, with respect to a detection of the motion vector, at least one of a setting regarding the plurality of images and a setting regarding an image area for use in the detection, based on at least one of a use of the motion vector that is to be detected by the detection unit and movement of an apparatus provided with the motion vector detection device.

According to another aspect, the present invention provides an image capturing apparatus comprising an image capturing unit, an image processing unit, and a motion vector detection device that includes a detection unit configured to detect a motion vector between a plurality of images, and a control unit configured to perform setting with respect to a detection of the motion vector, wherein the control unit changes, with respect to a detection of the motion vector, at least one of a setting regarding the plurality of images and a setting regarding an image area for use in the detection, based on at least one of a use of the motion vector that is to be detected by the detection unit, and movement of an apparatus provided with the motion vector detection device, and the detection unit detects the motion vector between the plurality of images that are captured by the image capturing unit and are supplied via the image processing unit.

According to a further aspect, the present invention provides a method of controlling a motion vector detection device that includes a detection unit configured to detect a motion vector between a plurality of images, the method comprising changing, with respect to the detection of the motion vector, at least one of a setting regarding the plurality of images and a setting regarding an image area for use in the detection, based on at least one of a use of the motion vector that is to be detected by the detection unit and movement of an apparatus provided with the motion vector detection device.

Further features of the present invention will become apparent from the following description of exemplary embodiments with reference to the attached drawings.

DESCRIPTION OF THE EMBODIMENTS

Exemplary embodiments of the present invention will now be described in detail in accordance with the accompanying drawings. Note that the following will describe a digital camera capable of generating images for use in motion vector detection as an example of a motion vector detection device according to embodiments of the present invention, but the configuration regarding image generation is not essential to the present invention. It is sufficient if images for use in motion vector detection can be obtained by any method, for example, a method of obtaining an image recorded in advance in a storage device, or the like, therefrom. Accordingly, the present invention is applicable to any electronic device including a personal computer, a mobile phone, a game console, and the like.

First Embodiment

Figure 1:
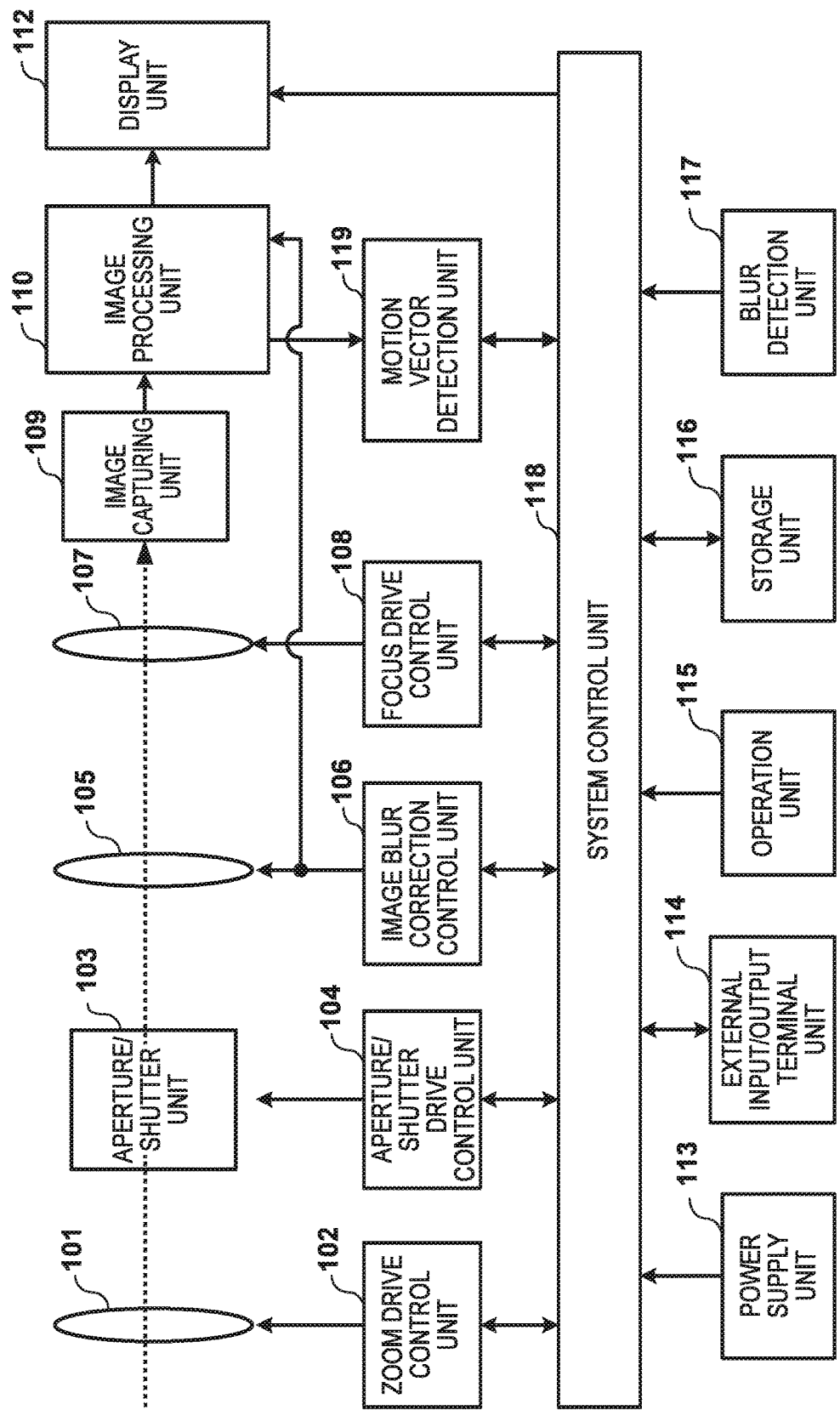
FIG. 1 is a block diagram illustrating a configuration of an image capturing apparatus provided with a motion vector detection device according to an embodiment.

FIG. 1 is a block diagram illustrating an example of a functional configuration of a digital camera according to the present embodiment. A zoom unit 101, an aperture/shutter unit 103, an image blur correction unit 105, and a focus unit 107 constitute an imaging optical system. The imaging optical system may be of an exchangeable lens type or a non-detachable type.

The zoom unit 101 includes a lens for changing a field angle (focal length) of the imaging optical system, and is driven by a zoom drive control unit 102. The aperture/shutter unit 103 includes an aperture having a mechanical shutter function, and is driven by an aperture/shutter drive control unit 104. The image blur correction unit 105 (also referred to as a "correction unit") includes a shift lens, and is driven by an image blur correction control unit 106. Note that the present embodiment performs optical image-blur correction in which the shift lens is driven, but an imaging element may be driven. Furthermore, the present embodiment may perform electronic image-blur correction in which an image reading range is changed. The focus unit 107 includes a focus lens for adjusting a focal distance of the imaging optical system, and is driven by a focus drive control unit 108.

An image capturing unit 109 converts an optical image formed by the imaging optical system into electrical signals using a plurality of photoelectric conversion elements (pixels) arranged in an imaging element, and outputs the resultant signals. An image processing unit 110 applies image processing such as A/D conversion, gamma correction, white balance adjustment, and demosaicing to the electrical signals output from the image capturing unit 109, so as to convert the electrical signals into image signals. The image processing unit 110 also processes the image signals according to the use. When, for example, electronic camera shake correction is performed, the image processing unit 110 changes a cropping position of the image signals according to the amount of correction performed by the image blur correction control unit 106. Furthermore, the image processing unit 110 also performs coding and decoding processing according to the storage format, resizing (expansion/reduction) processing, processing for generating image signals for display, object detection processing, and the like.

A motion vector detection unit 119 detects a motion vector based on image signals of two frames that were output from the image processing unit 110, and outputs the detected motion vector as motion vector information. The motion vector detection unit 119 is provided with a memory for temporarily storing an image signal. The motion vector detection processing that is performed by the motion vector detection unit 119 will be described in detail later. At least one of the functions of the image processing unit 110 and the motion vector detection unit 119 may be realized by a later-described system control unit 118 executing a program. Furthermore, at least one of the functions of the image processing unit 110 and the motion vector detection unit 119 may be realized by a hardware circuit such as an Application Specific Integrated Circuit (ASIC) or a Field-Programmable Gate Array (FPGA). The image processing unit 110, the system control unit 118, and the motion vector detection unit 119 realize the functions of a motion vector detection device.

A display unit 112 displays an image based on the signals for display that were output from the image processing unit 110. A power supply unit 113 supplies electrical power to the units of the digital camera according to the use. An external input/output terminal unit 114 is an interface and connector group to which an external device is to be connected directly, or via a network. Connection to the external device can be realized in a wired or a wireless manner. An operation unit 115 is an input device group that a user uses to input various instructions to a digital camera 100. If the display unit 112 is a touch display, a touch panel portion thereof is included in the operation unit 115. A storage unit 116 is a nonvolatile storage device, and stores various types of data such as a captured image, various setting values, and programs. A blur detection unit 117 detects the amount of blur of the digital camera 100 based on, for example, an output from an acceleration sensor, the position of the shift lens (correction unit 105), and the like.

The system control unit 118 includes one or more programmable central processors (CPU) and a memory. The system control unit 118 realizes the functions of the digital camera 100, by loading the program stored in the storage unit 116 onto the memory and executing the program using the CPU to control the units.

The digital camera 100 can set or select, with respect to image blur correction, (1) whether to enable or to disenable image blur correction, (2) whether to execute only optical image-blur correction or to execute both optical image-blur correction and electronic image-blur correction, and (3) the strength of the effect of electronic image-blur correction. The setting or selection can be made by a user with a switch included in the operation unit 115 or a Graphical User Interface (GUI) using the touch panel of the display unit 112.

When image blur correction is selected to be enabled, the system control unit 118 instructs the image blur correction control unit 106 to execute an image blur correction operation. The image blur correction control unit 106 executes the image blur correction operation until it is instructed by the system control unit 118 to stop the image blur correction operation.

Furthermore, the strength of the effect of electronic image-blur correction can be set in, for example, three stages of low, middle, and high, and the higher the set stage, the greater the image blur can be corrected, but the field angle of an image displayed on the display unit 112 is smaller, because a cropping area of image signals that is cropped by the image processing unit 110 is smaller.

The operation unit 115 also includes a release button that is pressed about half way down so that a first switch SW1 is turned on, and that is pressed completely down so that a second switch SW2 is turned on. The system control unit 118 construes that turning-on of the first switch SW1 in an imaging standby state means an instruction to start an imaging preparation operation, and turning-on of the second switch SW2 means an instruction to start an imaging and recording operation, and controls the units accordingly.

In the imaging preparation operation, the system control unit 118 executes AF and AE operations. For example, the system control unit 118 detects a focus lens position at which an object in a focal position detection area is brought into focus using a contrast detection method or a phase difference detection method. Then, the system control unit 118 drives the focus unit 107 via the focus drive control unit 108, and moves the focus lens to the detected focal position. Furthermore, the system control unit 118 determines exposure conditions (shutter speed, aperture value, imaging sensitivity, and flash on/off) based on information regarding the luminance of the object and a program diagram, for example. Note that the AF and AE operations described here are examples, and another method may be used.

In the imaging and recording operation, the system control unit 118 drives the aperture/shutter unit 103 via the aperture/shutter drive control unit 104, and performs exposure based on exposure conditions determined by the AE operation. An image captured by the image capturing unit 109 is subject to predetermined processing in the image processing unit 110, and the resultant image is stored in the storage unit 116 in an image file format for recording.

The operation unit 115 may include an operation mode selection switch for selecting any of a shooting mode and a playback mode. The shooting mode may include, in addition to a still image shooting mode and a moving image shooting mode, a shooting mode according to a use of shooting, such as a panning shooting mode. When the shooting mode is selected, the digital camera 100 is in the imaging standby state, and executes a predetermined operation such as live view display. When the playback mode is selected, the digital camera 100 displays, on the display unit 112, a still image or a moving image that is stored in the storage unit 116.

The operation unit 115 may include a moving image recording switch. When the moving image recording switch is pressed in the imaging standby state, imaging and recording of a moving image starts, and when the moving image recording switch is pressed during recording, the imaging of the moving image ends. The operation of the moving image recording switch is in preference to performing setting with the operation mode selection switch. Accordingly, when the moving image recording switch is pressed, even in a state in which the still image mode is selected, the system control unit 118 starts imaging and recording a moving image. Furthermore, when the first switch SW1 or the second switch SW2 is turned on during imaging and recording of a moving image, the system control unit 118 executes an operation for imaging a still image from the moving image that is being recorded. For example, the operation for imaging a still image from the moving image that is being recorded may be an operation for recording a frame of the moving image that is being recorded as a still image, but the recording of the moving image may be interrupted and a normal operation for imaging a still image may be executed.

Furthermore, the operation unit 115 may include a magnification change switch for changing a field angle of the imaging optical system. When the magnification change switch is operated, the system control unit 118 moves the zoom unit 101 via the zoom drive control unit 102 in a direction in which the magnification change switch is operated.

Motion Vector Detection Processing The following will describe the motion vector detection processing that is executed by the motion vector detection unit 119, in detail. In the present embodiment, a method using template matching will be described as an example of a motion vector detection method.

Figure 2A:
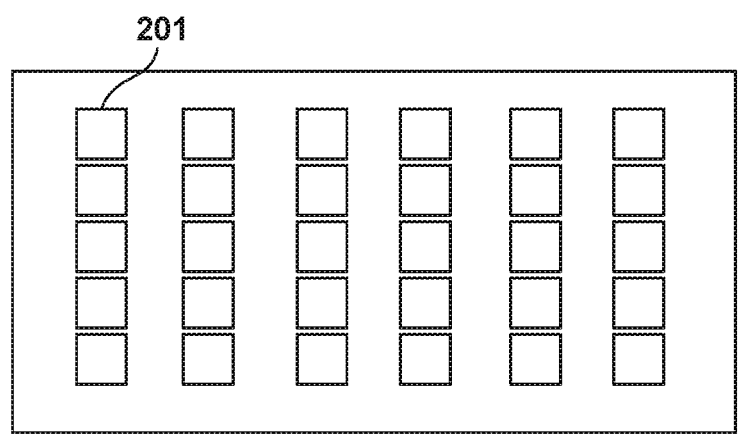
FIGS. 2A and 2B are diagrams illustrating a motion vector detection method using template matching.
Figure 2B:
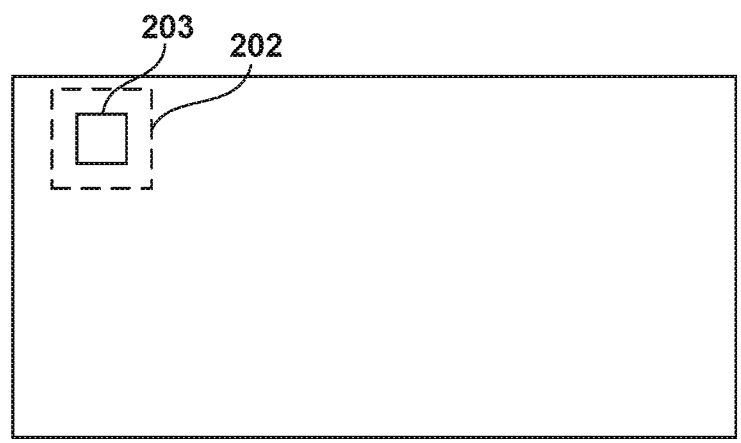

The motion vector detection method using template matching will be described with reference to FIGS. 2A and 2B. FIG. 2A shows an original image, and FIG. 2B shows a reference image. The original image and the reference image may be frame images of a moving image that was captured in the imaging standby state or during recording of the moving image, for example. Note that the original image and the reference image do not need to be two successive frames of a moving image, and may be an arbitrary pair of images.

The motion vector detection unit 119 arranges a plurality of template blocks 201 on the original image, as shown in FIG. 2A, searches the reference image for a region that has the highest correlation with each template block 201, and thereby detects a motion vector between the images. Because the search is performed such that a correlation value is calculated for each relative position between the template block 201 and the reference image, the amount of calculation that is required for the search increases with an increase in the area of a search range.

If the entire reference image is set as the search range, the amount of calculation will be huge, and thus, the motion vector detection unit 119 sets, as a search range 202, a partial region of the reference image that includes a region of the reference image that corresponds to the template block 201. The motion vector detection unit 119 sets, within the search range 202, a correlation value calculation block 203 that has the same size as that of the template block 201. Then, the motion vector detection unit 119 moves the setting position of the correlation value calculation block 203 within the search range 202, and calculates, at each position, a correlation value of correlation with the template block 201.

In the present embodiment, the motion vector detection unit 119 calculates the sum of absolute differences (SAD), which serves as an example of the correlation value. SAD is the sum of absolute values of differences in the luminance values of pixels at corresponding positions between the template block 201 and the correlation value calculation block 203. It is meant that the template block 201 and the correlation value calculation block 203 have more similar luminance patterns when the value of SAD is smaller. Note that the correlation value is not limited to SAD, and another value, such as the sum of squared differences (SSD) or a normalized cross-correlation (NCC), may be used.

The motion vector detection unit 119 calculates correlation values at a plurality of positions within the search range 202 at which the correlation value calculation block 203 can be set (all positions that can be set in terms of pixel, for example). Then, the motion vector detection unit 119 detects the position of the correlation value calculation block 203 at which the correlation is the highest (SAD is the smallest), as a destination of the template block 201. Accordingly, a motion vector is obtained that starts at the position (for example, the central coordinate) of the template block 201 in the original image and ends at the position (for example, the central coordinate) of the correlation value calculation block 203 that was detected as the destination. The motion vector detection unit 119 executes such motion vector detection processing for each of the template blocks 201.

The following will describe settings regarding motion vector detection. In the present embodiment, at least one of the following settings can be controlled with respect to motion vector detection.
(1) Settings for template blocks (for example, arrangement, size, and number);
(2) Settings for a search range (for example, size); and
(3) Settings for images (for example, size or size reduction ratio).

Arrangement of Template Blocks

For example, it is possible to control whether to arrange template blocks in a distributed manner over the entire original image, to arrange template blocks in a concentrated manner in the central portion thereof, or the like. If the template blocks are arranged so as to be distributed over the entire original image, the movement of the entire image, that is, the movement of the digital camera can easily be detected. Furthermore, if the template blocks are arranged so as to be concentrated in the central portion of the original image, the movement of an object positioned in the vicinity of the center of the viewing field can easily be detected.

Size of Template Blocks

The larger the size of a template block is, the more likely the luminance pattern in the block is to be an intrinsic pattern, and thus, essentially, the motion vector detection does not easily fail, and the reliability of the detected motion vector is high. However, if there is a moving object, the possibility that both a still object and the moving object are included in the block will be high, and the moving object is likely to affect the accuracy in motion vector detection.

Furthermore, the smaller the size of a template block is, the less likely the luminance pattern included therein is to be an intrinsic pattern, and thus, the motion vector detection easily fails, and the reliability of the detected motion vector is low. However, the possibility that both the still object and the moving object are included in the block is low, and the moving object has little effect on the accuracy in motion vector detection.

Number of Template Blocks

With an increase in the number of template blocks, the number of motion vectors to be detected may increase even in low-contrast scenes, or the like, in which the accuracy in motion vector detection using pattern matching is likely to be low. However, there may be a case when, due to an increase in the amount of calculation, the number of blocks cannot be increased if processing time is restricted, for example, if it is necessary to detect motion vectors for each frame while a moving image is captured. Furthermore, the smaller the number of template blocks is, the more advantageous it is in terms of processing time, but there may be a case when the number of motion vectors to be detected is extremely low in a scene in which the accuracy is likely to be low.

Size of Search Range

The larger the relative size of a search range to a template block is, the larger the maximum value of detectable movement is. On the other hand, the search range is likely to include a luminance pattern similar to that of the template block, and thus, the detection is likely to fail (or the reliability of a detected motion vector is low). The smaller the relative size of the search range to the template block is, the smaller the maximum value of detectable movement is. On the other hand, the search range is not likely to include a luminance pattern similar to that of the template block, and thus, the detection is not likely to fail (or the reliability of a detected motion vector is high).

Size of Images

If the size of images (an original image and a reference image) for use in motion vector detection is not reduced, or the size reduction ratio (1−size after reduction/size before reduction) is low, information regarding fine patterns will not be lost, and the accuracy in motion vector detection will be high. On the other hand, the further the size of the images is reduced by, for example, thinning or averaging pixels, the further the information regarding fine patterns is lost, and thus, the accuracy in motion vector detection is low. However, by reducing the size of the images, it is possible to detect larger movement without changing the sizes of a template block and a search range. Furthermore, when the same range of movement is to be detected, it is possible to set the template block and the search range to be small, and to alleviate the processing load.

Table 1 shows examples of effects of setting items on the performance of the motion vector detection. Note that Table 1 does not include the effects of the setting items on the motion vector detection processing load.

TABLE 1

| Setting items | Relationship between setting content and detection performance | |
| --- | --- | --- |
| Arrangement of template blocks | Arrangement in distributed manner in the entire image Movement of entire camera is detected | Arrangement in concentrated manner in center Movement of object in center of image is detected |
| Size of template blocks | Size: Large Reliability of detected motion vector is high Template blocks are likely to be affected by moving object | Size: Small Reliability of detected motion vector is low Template blocks are not likely to be affected by moving object |
| Search range | Range: Large Large movement can be detected Possibility of detection failure is high | Range: Small Large movement cannot be detected Possibility of detection failure is low |
| Number of template blocks | Large Large number of motion vectors are detected | Small Small number of motion vectors are detected |
| Size of image | Image size: Large Detection accuracy is high | Image size: Small Detection accuracy is low Effective field angle for viewing and search range are high |

As shown above, the settings for motion vector detection have different effects on the performance of the motion vector detection according to the items, and have a tradeoff relationship. Accordingly, by changing the settings for motion vector detection according a use of a detected motion vector, it is possible to realize the performance of the motion vector detection that is appropriate for the use.

Note that "large" and "small" in the size and number of template blocks, the size of a search range, and the size of images may refer to dimensions relative to a predetermined reference value, or a relative size of one to the other. Accordingly, there may be a reference value, a first value larger than the reference value, and a second value smaller than the reference value, or the reference value may be omitted (the first value or the second value may serve as a reference value).

The following will describe examples of setting of motion vector detection based on a use of a motion vector.

Uses of a motion vector are not particularly limited, but can be broadly divided into uses for detecting movement of a camera, and uses for detecting movement of an object. The movement of a camera can be used in camera shake correction, for example, and the movement of an object can be used in object blur correction, for example.

In order to detect movement of a camera, it is necessary to detect motion vectors indicating the entire movement of an image. Accordingly, template blocks are arranged so as to be distributed over the entire image. Furthermore, the size of the template blocks is set to be large (for example, larger than a reference size) in order to obtain high detection accuracy, and the size of a search range is set to be large (for example, larger than a reference size) in accordance with the size of the template blocks. Furthermore, the size of the images is not reduced in order to increase the detection accuracy. Note that every setting increases the load that is needed for the motion vector detection processing. Accordingly, if it is necessary to alleviate the processing load, such as in a case, for example, when detection processing needs to be completed within one frame period (inverse number of the frame rate) of a moving image, it is possible to reduce the number of template blocks (for example, as compared to the reference number).

The following will describe an example of setting of motion vector detection for detecting movement of an object. Ordinary users often perform imaging with a main object arranged in the vicinity of the center of a screen (or rarely perform imaging with the main object arranged at an end of the screen). Accordingly, arranging template blocks in a concentrated manner in the center of the screen will increase the likelihood of the image area of the main object being included in the template blocks. Note that template blocks may be or may not be arranged in the periphery of the image.

Furthermore, the size of the template blocks is set to be small (for example, smaller than the reference size) in view of possible movement of the main object. This reduces the possibility that both a still object and a moving object are included in the template blocks, and the effect of the moving object on the performance of motion vector detection. Along with the reduction in size of the template blocks, the size of a search range is also reduced (for example, as compared to the reference size). On the other hand, by reducing the size of the images, the actual search range is enlarged and the maximum value of detectable movement is increased.

Setting the size of the template blocks to be smaller or reducing the size of the images will reduce the load that is needed for the motion vector detection processing. Accordingly, the number of template blocks can be increased (for example, as compared to the reference number). By densely arranging a large number of small template blocks in the vicinity of the center of the original image, it is possible to detect a large number of motion vectors and to accurately detect movement of an object.

Note that, when the size of the search range is changed along with the change in size of the template blocks, it is a standard that the size of the search range is changed to such a size that detectable motion vectors have the same maximum values between before and after the change. In the above-described example, changing the size of the search range may be close to a change that is the standard, in both cases when movement of a camera is detected and when movement of an object is detected. When movement of an object is detected, the actual search range can be expanded by reducing the size of the images.

Figure 3A:
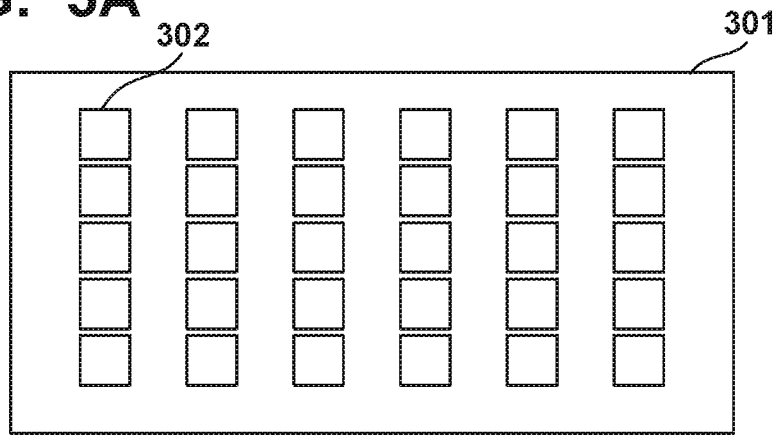
FIGS. 3A to 3C are diagrams illustrating examples of an image capturing apparatus and setting of motion vector detection for detecting movement of an object.
Figure 3B:
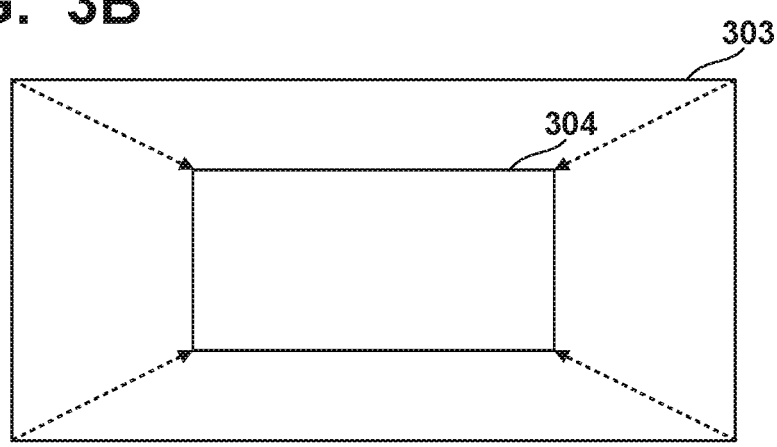
Figure 3C:
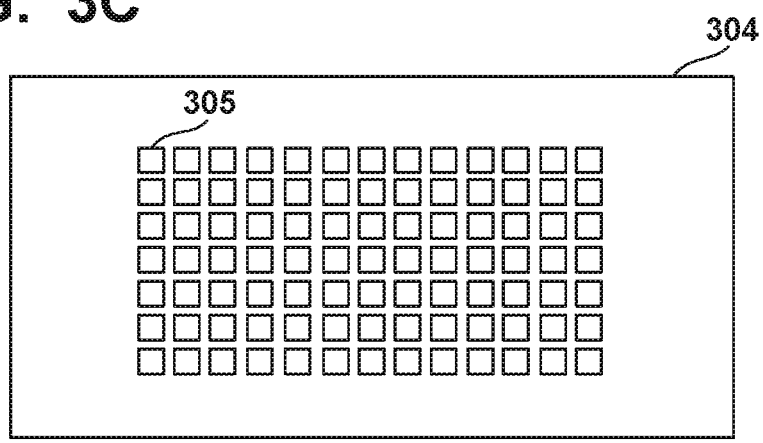

FIG. 3A shows an example of template blocks 302 that are set in an original image 301 when detecting motion vectors for use in detecting movement of a camera. Furthermore, FIGS. 3B and 3C show examples of a size-reduced image 304 obtained by reducing the size of the original image 301 when detecting motion vectors for use in detecting movement of an object, and of template blocks 305 that are set in the size-reduced image 304.

When detecting movement of a camera, motion vectors are detected without reducing the size of the images (the original image and the reference image), and thus, the image 301 in the original size is input to the motion vector detection unit 119. Furthermore, the motion vector detection unit 119 arranges (sets) the large-sized template blocks 302 so that they are distributed over the entire image. On the other hand, the motion vector detection unit 119 sets a distance between the template blocks 302 to be larger in a horizontal direction than in a vertical direction, so as to reduce the number of template blocks 302, in order to alleviate the processing load of the motion vector detection.

When detecting movement of an object, motion vectors are detected by reducing the size of the images (the original image and the reference image), and thus, the image 304 obtained by the image processing unit 110 reducing the size of an image 303 is input to the motion vector detection unit 119. Furthermore, the motion vector detection unit 119 arranges (sets) the small-sized template blocks 305 so that they are distributed in a concentrated manner in the central portion of the size-reduced image 304. By densely arranging the small-sized template blocks 305 at a uniform distance in the horizontal and vertical directions, the motion vector detection unit 119 sets a large number of template blocks 305 and increases the number of times for which motion vector detection is to be performed.

Table 2 shows examples of settings for motion vector detection based on uses of a motion vector according to the present embodiment. Note here that five combinations of setting items are shown for each use, but the number of combinations of setting items may be four or less, or six or more.

TABLE 2

| Setting items | For detection of camera movement | For detection of object movement |
|---|---|---|
| Arrangement of template blocks | Template blocks are arranged so as to be distributed over | Template blocks are arranged so as to be concentrated in |

TABLE 2-continued

| Setting items | For detection of camera movement | For detection of object movement |
| --- | --- | --- |
| | entire image | central portion of image |
| Size of template blocks | Large | Small |
| Size of search range | Large | Small |
| Number of template blocks | Small | Large |
| Size of image | Large | Small |

In the present embodiment, a shooting mode and a use of a motion vector are associated with each other in advance, and settings for motion vector detection are changed based on a set shooting mode.

Figure 4:
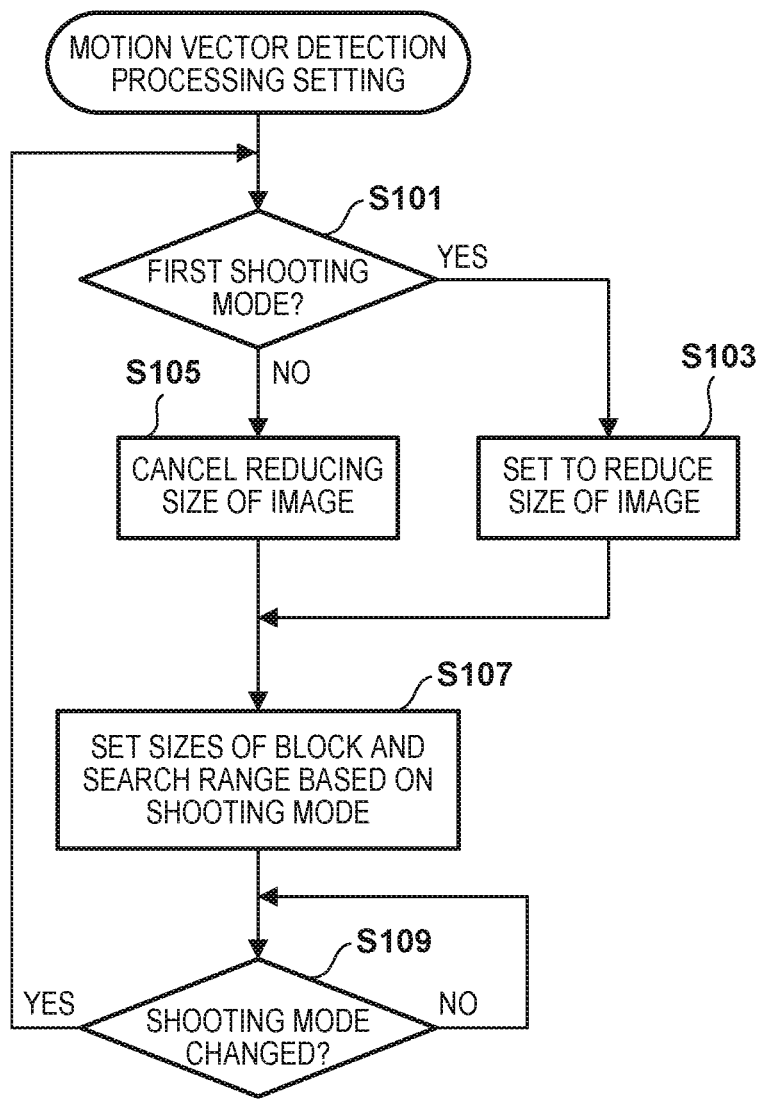
FIG. 4 is a flowchart of processing for setting motion vector detection based on a shooting mode according to a first embodiment.

FIG. 4 is a flowchart illustrating an overview of an operation for setting motion vector detection processing according to the present embodiment. This processing can be executed as background processing in, for example, an imaging standby state or an imaging and recording state.

For ease of description and understanding, in the present embodiment, the shooting modes that can be set by the digital camera 100 are classified into a first shooting mode and a second shooting mode. Here, "first shooting mode" refers to a shooting mode that is associated with motion vector detection processing for detecting movement of an object. For example, a panning shooting mode and a shooting mode for imaging using a tripod are classified into the first shooting mode. Furthermore, the second shooting mode is a shooting mode that is associated with motion vector detection processing for detecting movement of a camera. For example, shooting modes other than the first shooting mode can be classified into the second shooting mode. Furthermore, a shooting mode that places significance on camera shake correction can be classified into the second shooting mode.

In step S101, the system control unit 118 determines whether or not the shooting mode set by the operation mode selection switch of the operation unit 115 is the first shooting mode. If it is determined that the first shooting mode has been set, the system control unit 118 advances the procedure to step S103, and otherwise, to step S105.

In step S103, the system control unit 118 changes the setting regarding the size of the images that are to be supplied to the motion vector detection unit by the image processing unit 110. Since, in the first shooting mode, motion vectors for use in detecting movement of an object are detected, the system control unit 118 changes the setting so that the images whose size was reduced to a predetermined size are supplied to the motion vector detection unit 119. Furthermore, the system control unit 118 may notify the motion vector detection unit 119 of the supply of the size-reduced images. When the setting ends, the system control unit 118 advances the procedure to step S107.

On the other hand, in step S105, if the current setting regarding the size of the images is a setting in which the size of the images is to be reduced, the system control unit 118 changes the current setting to a setting in which image size reduction is not to be performed (cancels the setting in which the size is to be reduced). Since step S105 is executed when the current shooting mode is the second shooting mode, if the setting in which the size is to be reduced has been set, the system control unit 118 cancels the setting so that motion vector detection using the images of the original size is performed. Note that, if mode change is performed between shooting modes classified into the second shooting mode, the system control unit 118 does not change the setting regarding the size of the images. When the setting regarding the size of the images is changed as necessary, the system control unit 118 advances the procedure to step S107.

In step S107, based on the set shooting mode, the system control unit 118 sets at least one item other than the size of the images, among the setting items for the motion vector detection processing, for the motion vector detection unit 119. Specifically, the system control unit 118 sets at least one of setting items including settings regarding the size, arrangement, and number of template blocks, and a setting regarding the size of a search range. Then, the system control unit 118 advances the procedure to step S109 where the system control unit 118 determines whether the shooting mode has been changed or not. If it is determined that the shooting mode has been changed, the system control unit 118 returns the procedure to step S101. Otherwise, the system control unit 118 repeatedly performs step S109.

Note that the setting that is performed in steps S103 and S107 may be setting a specific value, setting a code that corresponds to the set value, or setting/cancelling a flag. For example, if there is one option for the size reduction ratio when reducing the size of the images, whether or not to perform size reduction may be set, and if there are a plurality of options, the code that corresponds to an option may be set. Note that the setting of step S107 may be different between shooting modes, or may be common between all of the shooting modes that are classified into the first shooting mode (second shooting mode). In either case, a shooting mode and the corresponding setting value may be associated with each other, and may be stored in advance in the storage unit 116. Also, the system control unit 118 reads the set value that corresponds to a set shooting mode from the storage unit 116, and can set the read value for the image processing unit 110 or the motion vector detection unit 119. The motion vector detection unit 119 starts motion vector detection processing according to the setting.

The motion vector detection unit 119 detects a motion vector for each template block, and then calculates a representative motion vector. The method of calculating a representative motion vector is not particularly limited, but it is possible, for example, to generate a histogram of the motion vectors and to calculate the motion vector that has the highest frequency as a representative motion vector. Alternatively, it is also possible to average the motion vectors detected for the respective template blocks and to regard the average as a representative motion vector.

By driving the image blur correction unit 105 based on the representative motion vector, or changing the position (cropping position) of an image area to be read from the image capturing unit 109, it is possible to suppress object blur or camera shake. Any known optical or electronic blur/shake prevention methods based on a representative motion vector may be used.

As described above, in the present embodiment, it is possible to control a motion vector detection method based on a use of a motion vector, or to change a setting regarding the size of images or the size of template blocks. Accordingly, it is possible to detect a motion vector while placing significance on the property required for an intended use, or to more finely control the motion vector detection method.

Second Embodiment

Hereafter, a second embodiment according to the present invention will be described. In the first embodiment, motion vector detection processing is controlled by changing settings based on a use of a motion vector. In the present embodiment, motion vector detection processing is controlled by changing settings based on the detection of specific movement, specifically, large movement in a specific direction, of an apparatus provided with the motion vector detection device.

In the present embodiment, it is assumed that the apparatus provided with the motion vector detection device is the digital camera 100 described in the first embodiment, and descriptions of the configurations of the digital camera 100 are omitted. Furthermore, the following will describe a configuration for changing a setting in accordance with detection of a panning operation, which serves as an example of the large movement in a specific direction of the apparatus provided with the motion vector detection device.

Figure 5:
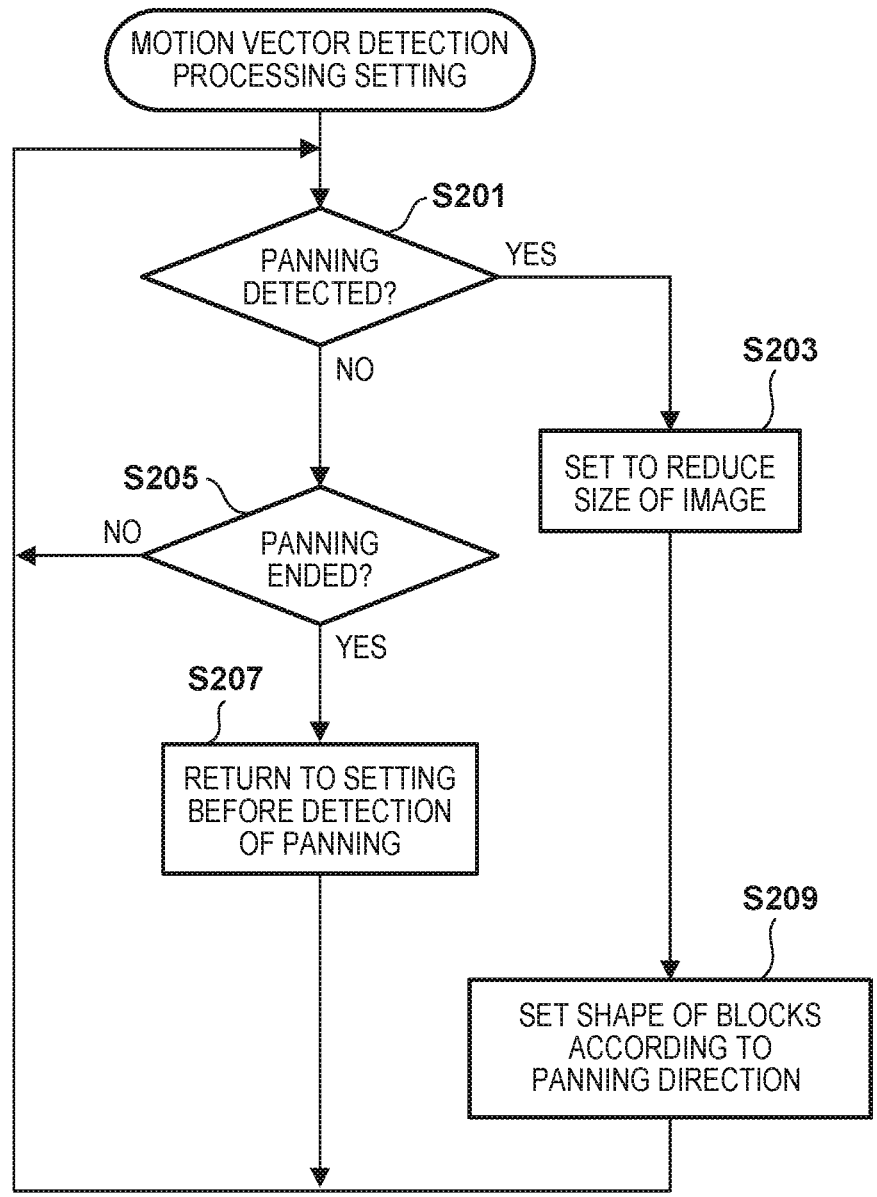
FIG. 5 is a flowchart of processing for setting motion vector detection based on a shooting state according to a second embodiment.

FIG. 5 is a flowchart illustrating an overview of an operation for setting motion vector detection processing according to the present embodiment.

In step S201, the system control unit 118 determines whether or not the movement of the digital camera 100 is panning based on an amount of blur detected by the blur detection unit 117, and if it is determined that the movement is panning, the system control unit 118 further detects the direction of the panning. A known method can be used to detect panning and the direction thereof. If it is determined that the digital camera 100 is being panned, the system control unit 118 advances the procedure to step S203, and otherwise, to step S205.

In step S203, the system control unit 118 changes the setting regarding the size of images that are to be supplied to the motion vector detection unit by the image processing unit 110. Since the movement of the digital camera is large during panning, the system control unit 118 changes the setting so that the images whose size was reduced to a predetermined size are to be supplied to the motion vector detection unit 119, in order to be able to detect large motion vectors. Note that a size reduction ratio for the images when panning was detected can be set to be larger than a size reduction ratio that is set for the motion vector detection for detecting movement of an object of the first embodiment. The system control unit 118 may notify the motion vector detection unit 119 of the supply of the size-reduced images. When the setting ends, the system control unit 118 advances the procedure to step S209.

In step S205, the system control unit 118 determines whether or not the panning has ended. If it is determined that the panning has ended, in step S207, the settings for motion vector detection are returned to the settings before the panning was detected. Alternatively, the system control unit 118 may newly configure settings according to the first embodiment. If it is not determined that the panning has ended (if panning has not been detected continuously), the system control unit 118 returns the procedure to step S201.

In step S209, the system control unit 118 sets, among the setting items for the motion vector detection processing, items other than the size of the images for the motion vector detection unit 119. In the present embodiment, in addition to the settings regarding the size, arrangement, and number of template blocks, and the size of a search range, the shape of the template blocks are set (changed).

In the setting based on uses of a motion vector that are shown in FIGS. 3A and 3C, a template block is set as a square shape or a shape in which the ratio of the short sides to the long sides is approximately one, and the shape is not changed even if the size is changed. This is to cover various movement directions. On the other hand, panning is an operation to move a camera in a specific direction, and the movement in the specific direction is significantly large. Accordingly, in the present embodiment, the shape of a template block is changed based on a detected panning direction. For example, it is possible to change the shape to a rectangle that has an aspect ratio equal to the ratio of a vertical component and a horizontal component in the panning direction, or to expand the shape (by, for example, a predetermined percentage) in the direction of the vertical component or the horizontal component of the panning direction, whichever is larger. Note that these are merely examples, and the shape and size can be set by various methods appropriate for motion vector detection in panning. Furthermore, in order to expand a search range, it is possible to change at least one of the shape and size of the search range, similar to the case of the template block.

Figure 6A:
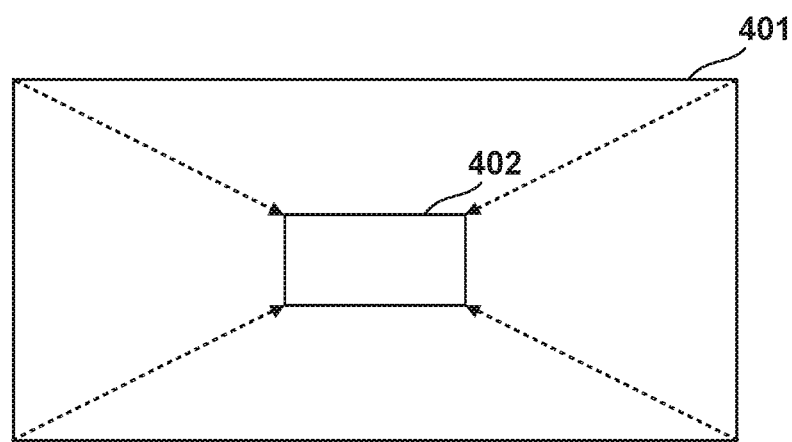
FIGS. 6A and 6B are diagrams illustrating an example of setting of motion vector detection when panning in a lateral direction is detected.
Figure 6B:
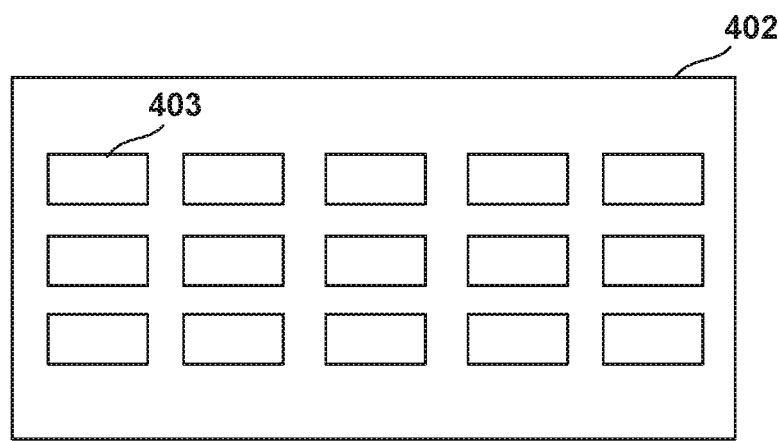

FIGS. 6A and 6B are schematic diagrams illustrating an example of setting of motion vector detection when panning in the horizontal direction was detected. FIG. 6A shows a setting regarding the image size, and FIG. 6B shows a setting regarding template blocks. As shown in FIG. 6A, the size of an original image 401 is reduced to that of an image 402. As is clear from the comparison with FIG. 3B, the size reduction ratio, when panning is detected, is larger than the size reduction ratio of the first embodiment, in order to be able to detect a large amount of movement of the digital camera 100 that is being panned.

Furthermore, as shown in FIG. 6B, template blocks 403 that are expanded in the panning direction are set so as to be distributed over the entire region of the size-reduced image 402 (or the entire region in at least a panning direction). As described above, if the size of the template blocks is enlarged, the size of the search ranges is also enlarged along with the increase in size of the template blocks. The enlargement in size reduces the number of template blocks that can be set, but detection of an amount of movement in the panning direction is in preference to the number of detectable motion vectors. Due to the reduction in size of the original image and the template blocks (and the search ranges) that are expanded in the panning direction, it is possible to more reliably detect a large amount of movement in a panning direction.

When the setting in step S209 ends, the system control unit 118 returns the procedure to step S201. Note that, if panning has been detected continuously, it is not necessary to execute steps S203 and S209 repeatedly. For example, steps S203 and S209 may be skipped until the end of the panning is detected, may be executed only when there is a large change in the detected panning direction, or may be executed in a predetermined cycle.

As described above, in the present embodiment, the settings for motion vector detection are changed based on the detection of movement, specifically, large movement in a specific direction, of the apparatus provided with the motion vector detection device. For example, it is possible to expand template blocks in a direction of movement of the apparatus, or to reduce the size of the original image and the reference image. Accordingly, even in a case, such as panning, when large movement occurs in a specific direction, it is possible to reliably detect a motion vector.

Third Embodiment

Hereafter, a third embodiment of the present invention will be described. In the present embodiment, motion vector detection processing is controlled by changing settings based on the detection of specific movement using an apparatus provided with the motion vector detection device, specifically, sufficiently small movement. In the present embodiment, it is assumed that the apparatus provided with the motion vector detection device is the digital camera 100 described in the first embodiment, and descriptions of configurations of the digital camera 100 are omitted.

Figure 7:
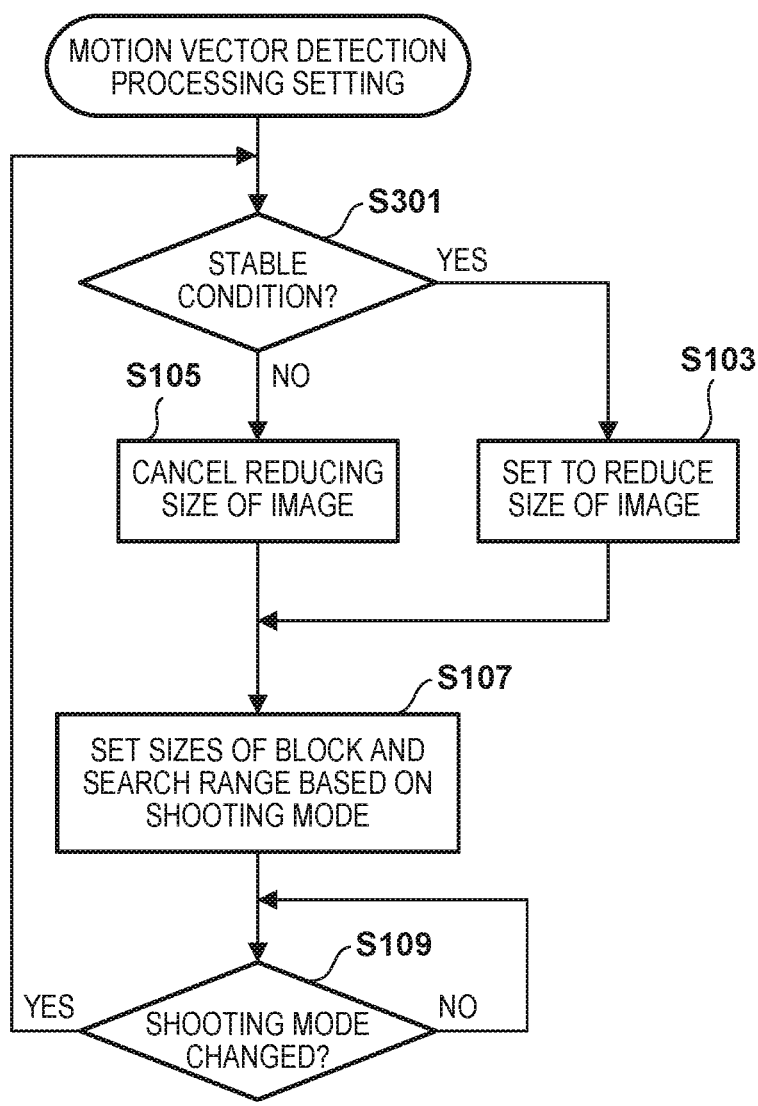
FIG. 7 is a flowchart of processing for setting motion vector detection based on a shooting state according to a third embodiment.

FIG. 7 is a flowchart illustrating an overview of an operation for setting motion vector detection processing according to the present embodiment. In FIG. 7, the same reference numerals as those of FIG. 4 are given to common processing with the first embodiment.

In step S301, the system control unit 118 determines whether or not the digital camera 100 is in a stable condition, based on the amount of blur detected by the blur detection unit 117. "Stable condition" refers to a still condition or a condition of sufficiently small movement, and can be determined if, for example, the amount of blur is continuously less than a threshold for a predetermined time period.

The "stable condition" may be a case when, for example, the digital camera 100 is mounted to a supporting member, such as a tripod, the digital camera 100 is placed on a fixed object, and the condition in which a user holds a camera is stable. If it is determined that the digital camera 100 is in the stable condition, the system control unit 118 advances the procedure to step S103, and otherwise, to step S105.

If the digital camera 100 is in the stable condition, detection of movement of an object rather than movement of the camera is advantageous for, for example, blur prevention control. Accordingly, if it is determined that the digital camera 100 is in the stable condition, the system control unit 118 performs, for example, the same setting as the setting for detecting movement of an object of the first embodiment (steps S103 and S107).

On the other hand, if the digital camera 100 is not in the stable condition, detection of movement of the camera rather than movement of an object is advantageous for, for example, blur prevention control. Accordingly, if it is determined that the digital camera 100 is not in the stable condition, the system control unit 118 performs, for example, the same setting as the setting for detecting movement of a camera of the first embodiment (steps S105 and S107).

As described above, in the present embodiment, the size of the frame images and the setting of template blocks, which are settings for motion vector detection, are changed based on a shooting state of an image capturing apparatus, and the detection of a fixed point imaging serving as an example thereof. Accordingly, it is possible to detect movement of an object that is appropriate for a use of a motion vector.

As described above, in the present embodiment, settings for motion vector detection are changed to settings appropriate for detecting movement of an object based on the detection of movement, specifically, a stable condition, of an apparatus provided with the motion vector detection device. For example, it is possible to reduce the size of an original image and a reference image, or to arrange template blocks in a concentrated manner in the central portion of the image. Accordingly, it is possible to dynamically and suitably control settings for motion vector detection according to the situation.

Other Embodiments

The foregoing embodiments may be implemented in a combination. For example, by combining the first embodiment and the third embodiment, it is possible to change the setting for detecting movement of a camera to the setting for detecting movement of an object when the camera is in a stable condition, even if a shooting mode associated with the setting for detecting movement of the camera is selected. Furthermore, for example, when the first embodiment and the second embodiment are combined with each other, the setting according to a set shooting mode can be performed in a state in which no panning has been detected, and the setting can be changed to the setting appropriate for detecting large movement in a specific direction, as long as the panning is being detected. Of course, another combination is also possible.

Embodiment(s) of the present invention can also be realized by a computer of a system or an apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., an application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., a central processing unit (CPU), or a micro processing unit (MPU)) and may include a network of separate computers or separate processors to read out and to execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), a digital versatile disc (DVD), or a Blu-ray Disc (BD)™) a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. A motion vector detection device comprising:
    at least one processor and at least one memory that function as:
    (a) a detection unit configured to detect a motion vector between a plurality of images; and
    (b) a control unit configured to perform setting with respect to a detection of the motion vector,
    wherein the detection unit detects the motion vector by searching for an area, which has a correlation with a template block that is set in one of the plurality of images, within a search range that is set for another one of the plurality of images, and
    wherein the control unit changes a size and a number of the template block, based on a use of the motion vector that is detected by the detection unit.

2. The motion vector detection device according to claim 1, wherein the use includes a use for detecting movement of an apparatus that includes the motion vector detection device, and a use for detecting movement of an object between the plurality of images.

3. The motion vector detection device according to claim 2, wherein the control unit sets a larger size reduction ratio of the plurality of images if the use is for detecting movement of an object than if the use is for detecting movement of the apparatus.

4. The motion vector detection device according to claim 1, wherein the control unit further changes the search range based on the use.

5. The motion vector detection device according to claim 4, wherein the control unit sets the search range having a size according to the size of the template block.

6. The motion vector detection device according to claim 1, wherein the control unit further changes arrangement of the template block based on the use.

7. The motion vector detection device according to claim 6, wherein (i) the use includes a use for detecting movement of an apparatus that includes the motion vector detection device, and a use for detecting movement of an object between the plurality of images, (ii) the control unit sets the template block so as to be distributed over one of the plurality of images if the use is for detecting movement of the apparatus, and (iii) the control unit sets a lamer greater number of smaller template blocks with a higher density if the use is for detecting movement of an object than if the use is for detecting movement of the apparatus.

8. The motion vector detection device according to claim 1, wherein the control unit sets the number of the template block in a case when the size of the template block is a first size to be greater than in a case when the size of the template block is a second size that is larger than the first size.

9. The motion vector detection device according to claim 8, wherein the control unit sets the size of the template block to the first size if the use is a use for detecting movement of an object between the plurality of images, and sets the size of the template block to the second size if the use is a use for detecting movement of an apparatus that includes the motion vector detection device.

10. The motion vector detection device according to claim 1, wherein an apparatus that includes the motion vector detection device is an image capturing apparatus that has a plurality of shooting modes, and
the control unit changes the size and the number of the template block according to the use with which the shooting mode set in the image capturing apparatus is associated.

11. An image capturing apparatus comprising:
(A) an image capturing unit; and
(B) at least one processor and at least one memory function as:
(a) an image processing unit;
(b) a detection unit configured to detect a motion vector between a plurality of images; and
(c) a control unit configured to perform setting with respect to a detection of the motion vector,
wherein the detection unit detects the motion vector by searching for an area, which has a correlation with a template block that is set in one of the plurality of images, within a search range that is set for another one of the plurality of images,
wherein the control unit changes a size and a number of the template block, based on a use of the motion vector that is detected by the detection unit, and
wherein the detection unit detects the motion vector between the plurality of images that are captured by the image capturing unit and are supplied via the image processing unit.

12. The image capturing apparatus according to claim 11, wherein the use includes a use for detecting movement of the image capturing apparatus, and a use for detecting movement of an object between the plurality of images, and wherein blur prevention control by using the motion vector is performed based on the use.

13. A method of controlling a motion vector detection device, the method comprising:
detecting motion of a vector by searching for an area, which has a correlation with a template block that is set in one of a plurality of images, within a search range that is set for another one of the plurality of images; and
changing a size and a number of the template block, based on a use of the motion vector that is to be detected.

14. A motion vector detection device comprising:
at least one processor and at least one memory functioning as:
(a) a detection unit configured to detect a motion vector between a plurality of images; and
(b) a control unit configured to perform setting with respect to a detection of the motion vector,
wherein the detection unit detects the motion vector by searching for an area, which has a correlation with a template block that is set in one of the plurality of images, within a search range that is set for another one of the plurality of images, and
wherein the control unit sets a greater number of smaller template blocks with a higher density if a use of the motion vector that is to be detected by the detection unit is for detecting movement of an object than if the use is for detecting movement of an apparatus that includes the motion vector detection device.

15. An image capturing apparatus comprising:
(A) an image capturing unit; and
(B) at least one processor and at least one memory functioning as:
(a) an image processing unit;
(b) a detection unit configured to detect a motion vector between a plurality of images; and
(c) a control unit configured to perform setting with respect to a detection of the motion vector,
wherein the detection unit detects the motion vector by searching for an area, which has a correlation with a template block that is set in one of the plurality of images, within a search range that is set for another one of the plurality of images, and
wherein the control unit sets a greater number of smaller template blocks with a higher density if a use of the motion vector that is to be detected by the detection unit is for detecting movement of an object than if the use is for detecting movement of an apparatus that includes the motion vector detection device.

16. A method of controlling a motion vector detection device, the method comprising:
detecting a motion vector by searching for an area, which has a correlation with a template block that is set in one of a plurality of images, within a search range that is set for another one of the plurality of images; and
setting a greater number of smaller template blocks with a higher density if a use of the motion vector that is to be detected is for detecting movement of an object than if the use is for detecting movement of an apparatus that includes the motion vector detection device.

* * * * *